(12) United States Patent
Fukazawa et al.

(10) Patent No.: US 8,340,708 B2
(45) Date of Patent: Dec. 25, 2012

(54) PORTABLE TERMINAL

(75) Inventors: Kenji Fukazawa, Saitama (JP); Hiroshi Yoshida, Saitama (JP)

(73) Assignee: NEC Corporation, Tokyo (JP)

( * ) Notice: Subject to any disclaimer, the term of this patent is extended or adjusted under 35 U.S.C. 154(b) by 665 days.

(21) Appl. No.: 11/887,316

(22) PCT Filed: Mar. 28, 2006

(86) PCT No.: PCT/JP2006/306320
§ 371 (c)(1),
(2), (4) Date: Sep. 27, 2007

(87) PCT Pub. No.: WO2006/104156
PCT Pub. Date: Oct. 5, 2006

(65) Prior Publication Data
US 2009/0137268 A1 May 28, 2009

(30) Foreign Application Priority Data
Mar. 28, 2005 (JP) .................................. 2005-092145

(51) Int. Cl.
*H04M 1/00* (2006.01)
(52) U.S. Cl. .................. 455/550.1; 455/575.1
(58) Field of Classification Search ............... 455/575.3, 455/575.4, 575.1, 90.3, 567, 569.1; 181/199, 181/148, 153; 379/420.02, 428.01, 388.02, 379/390.03
See application file for complete search history.

(56) References Cited

U.S. PATENT DOCUMENTS

| | | | | |
|---|---|---|---|---|
| 5,790,679 A * | 8/1998 | Hawker et al. | ................ | 381/163 |
| 6,134,336 A * | 10/2000 | Clark | ............................ | 381/371 |
| 7,058,366 B2 * | 6/2006 | Patterson | ..................... | 455/90.3 |
| 7,092,745 B1 * | 8/2006 | D'Souza | ..................... | 455/575.1 |
| 7,416,048 B2 * | 8/2008 | Hongo et al. | ................. | 181/199 |

(Continued)

FOREIGN PATENT DOCUMENTS
EP 0 909 077 A2 4/1999
(Continued)

OTHER PUBLICATIONS

Extended Supplementary European Search Report dated Apr. 1, 2011.

*Primary Examiner* — Edward Urban
*Assistant Examiner* — Golam Sorowar
(74) *Attorney, Agent, or Firm* — Scully, Scott, Murphy & Presser, P.C.

(57) ABSTRACT

A portable telephone according to this invention includes a housing (10) which incorporates a display unit and a receiving speaker (6), a first sound emission portion (8) and a second sound emission portion (9) which guide an output sound from the receiving speaker to the outside of the housing, a sound guide hole (26) which communicates the first sound emission portion and the second sound emission portion, and a screen (12) which protects the display unit. The first sound emission portion is formed at a position opposing an output sound generating main surface (6a) of the receiving speaker, and the second sound emission portion is formed at a portion adjacent to the position opposing the output sound generating main surface. The sound guide hole is formed by covering a groove (23), formed on the housing to connect the first sound emission portion to the second sound emission portion, with the screen. This arrangement enables stable emission of an output sound without sacrificing downsizing and thickness reduction of the portable telephone regardless of the position of an earpiece portion to allow a user to listen to the output sound that the user's ear pinna opposes.

6 Claims, 7 Drawing Sheets

U.S. PATENT DOCUMENTS

| | | |
|---|---|---|
| 2002/0127974 A1 | 9/2002 | Song |
| 2004/0253995 A1* | 12/2004 | Matsumoto et al. ........ 455/569.1 |
| 2005/0130716 A1* | 6/2005 | Shin et al. .................. 455/575.1 |

FOREIGN PATENT DOCUMENTS

| | | |
|---|---|---|
| JP | 10-304036 | 11/1998 |
| JP | 2000-244618 | 9/2000 |
| JP | 2001-230841 | 8/2001 |
| JP | 2003-224640 | 8/2003 |
| JP | 2003-319027 | 11/2003 |
| JP | 2004-170575 | 6/2004 |
| JP | 2004-328047 | 11/2004 |
| JP | 2005-033723 | 2/2005 |
| WO | WO 2004/054211 | 6/2004 |

\* cited by examiner

PORTABLE TERMINAL

TECHNICAL FIELD

The present invention relates to various types of portable terminals such as a portable telephone, a PHS (Personal Handyphon System), and other information portable terminals.

BACKGROUND ART

In a portable telephone, generally, a housing accommodates a receiving speaker, and a through hole is formed to extend from the receiving speaker accommodating portion to the outside. When speaking over the telephone, the user applies his ear over the through hole, and speaks while listening to the output sound produced by the receiving speaker through the through hole. As the structure of the through hole, the following ones have been proposed.

As the first prior art, reference 1 (Japanese Patent Laid-Open No. 10-304036) discloses a technique which forms an earpiece portion to have a projecting structure that projects from a housing, and provides the first through hole, which is directed to the ear hole, and the second through (pre-leak portion), which is open to the outer space that does not correspond to the ear hole, when the user's ear pinna opposes the first through hole. According to this technique, as the earpiece portion is provided with the pre-leak portion through which the sound leaks appropriately, even if the gap between the earpiece portion and the ear changes, the influence of the change can be moderated.

As the second prior art, reference 2 (Japanese Patent Laid-Open No. 2000-244618) discloses a technique of a folding portable telephone which includes a through hole extending from a receiving speaker to an earpiece portion, and in which a groove is formed to extend from the opening of the through hole to the end of a housing. According to this technique, the receiving speaker can also serve as a ringer. By forming the groove to extend from the opening of the through hole to the end of the housing, the sound leaks appropriately, stabilizing the sound quality.

As the third prior art, reference 3 (Japanese Patent Laid-Open No. 2001-230841) discloses a technique which provides the first through hole formed in a housing in front of a receiving speaker (sound source), a voice guide structure which guides the voice from a surface other than the front direction of the receiving speaker to the outside, and the second through hole formed to emit the sound to the outside of the housing, so that the generated voice is emitted to the outside from surfaces in two directions. According to this technique, the voice from the receiving speaker can be emitted to the outside of the housing efficiently without increasing the power of the receiving speaker or increasing the voltage applied to the receiving speaker, thus increasing the sound pressure of the voice.

DISCLOSURE OF INVENTION

Problems to be Solved by the Invention

When the user applies his ear to the earpiece portion for speaking over the telephone, he may undesirably cover the through hole with his ear helix, earlobe, or the like (to be merely referred to as an "ear helix or the like" hereinafter). In this case, the output sound volume decreases greatly. To solve this problem, a plurality of through holes may extend from the receiving speaker. Also, the size of the receiving speaker itself may be increased to enlarge the formation region of the through hole that opposes the receiving speaker.

Currently, considerable downsizing demands arise for portable terminals represented by a portable telephone, and the downsizing demands for electronic components to be mounted in the portable terminals are also strong. The receiving speaker is no exception and also faces a strong downsizing demand. To make the receiving speaker large is accordingly difficult. Even if a plurality of through holes are formed in a downsized receiving speaker, the ear helix or the like may undesirably cover all of the plurality of through holes.

Recently, a portable telephone with a camera, which has a multifunction of both a camera and a portable telephone, is becoming popular. For example, a technique has been proposed with which a CCD (Charge Coupled Device) camera and a liquid crystal screen are arranged on the front surface of the telephone main body. The CCD camera can capture the user's face, and the captured image can be transmitted to the other party. A W-CDMA (Wideband Code Division Multiple Access) portable telephone has also been proposed which can send the motion image captured by the user to the other party. As a portable telephone incorporating a storage medium such as an SD card becomes popular, the performance of the camera mounted in the portable telephone has improved remarkably. Regarding the pixel number, it exceeded one million and reached two million. A product mounted with a camera that has an auto-focus function is also on the market.

From this background, a camera mounted in a portable telephone tends to be large regardless of the need for a compact portable telephone. This tendency forces the receiving speaker, which is conventionally arranged near the center of the housing, to be arranged on the outer side of the housing. More specifically, although the receiving speaker is conventionally arranged to oppose almost the center of the earpiece, it cannot but be arranged at the end of the earpiece portion. Under these circumstances, when the user speaks over the telephone while applying his ear to the earpiece portion, he may undesirably cover the through hole with his ear helix or the like, and the output sound may not reach the user with a sufficient volume at a possibility worse than in a conventional case.

According to the technique described in reference 1, as the earpiece portion must project, the thickness of the portable telephone inevitably increases.

The present invention has been made in view of the above background, and has as its object to provide a portable terminal which can emit an output sound stably regardless of what position of the earpiece portion the user's ear pinna may oppose, while achieving downsizing and thickness reduction.

Means of Solution to the Problems

A portable terminal according to the present invention comprises a housing which incorporates a display unit and a receiving speaker, an earpiece portion which allows a user to listen to an output sound from the receiving speaker, a first sound emission portion and a second sound emission portion which guide the output sound from the receiving speaker to the earpiece portion, a sound guide hole which communicates the first sound emission portion and the second sound emission portion, and a screen which protects the display unit, wherein the first sound emission portion is formed at a position opposing an output sound generating main surface of the receiving speaker, the second sound emission portion is formed at a portion adjacent to the position opposing the output sound generating main surface of the receiving speaker, and the sound guide hole is formed by covering a groove with the screen, the groove being formed in the housing to connect the first sound emission portion and the second sound emission portion.

Effects of the Invention

According to the present invention, the second sound emission portion is arranged at the portion adjacent to the position opposing the output sound generating main surface of the receiving speaker. Even when the ear helix or the like of the user's ear pinna covers the first sound emission portion located at the position opposing the output sound generating main surface, the user can listen to the output sound from the second sound emission portion through the sound guide hole. The first sound emission portion is formed at the position opposing the receiving speaker, and the second sound emission portion is formed at the portion adjacent to the position opposing the receiving speaker. Thus, the first sound emission portion and second sound emission portion can be arranged to be appropriately spaced apart from each other in the earpiece. This provides a portable terminal that can emit an output sound stably regardless of what position of the earpiece portion the user's ear pinna opposes.

The sound guide hole for guiding the second to the second sound emission portion is formed by only covering the groove formed in the housing surface with the screen. The sound guide hole can therefore be formed without changing the thickness of the portable telephone. As the second sound emission portion is formed at a position other than the surface that opposes the receiving speaker, the receiving speaker can be further downsized. The presence of the second sound emission portion increases the degrees of design freedom of the position where the receiving speaker can be formed.

Therefore, the present invention can advantageously provide a portable terminal which can emit an output sound stably regardless of what position of the earpiece portion the user's ear pinna may oppose, while achieving downsizing and thickness reduction.

BEST MODE FOR CARRYING OUT THE INVENTION

Embodiments to which the present invention is applied will be described in detail with reference to the drawings. Note that any other embodiments can also belong to the category of the present invention as far as they comply with the scope of the present invention.

First Embodiment

Figure 1A:
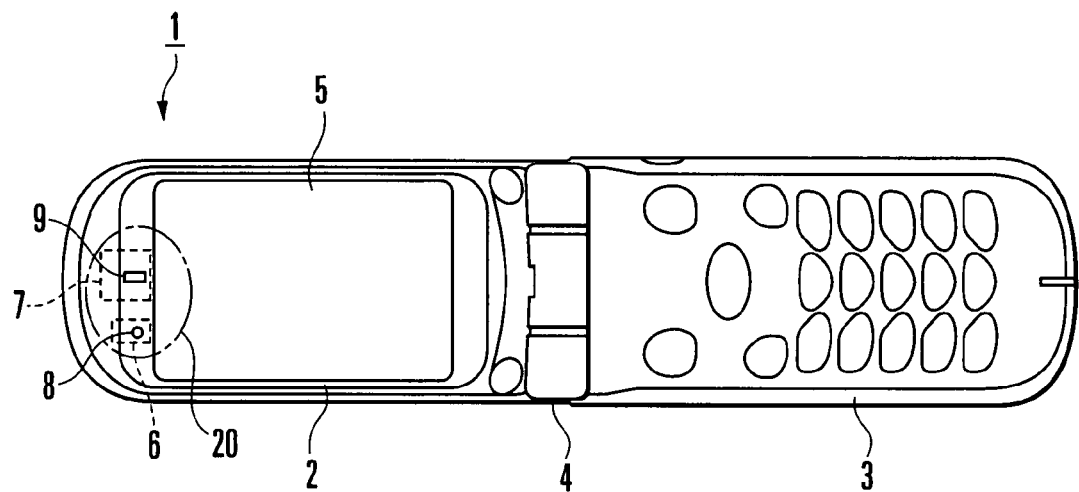
FIG. 1A is a view showing the outer appearance of the display side of a portable telephone according to the first embodiment of the present invention, in a state wherein the surface of a display unit housing and the surface of an input unit housing are open apart.
Figure 1B:
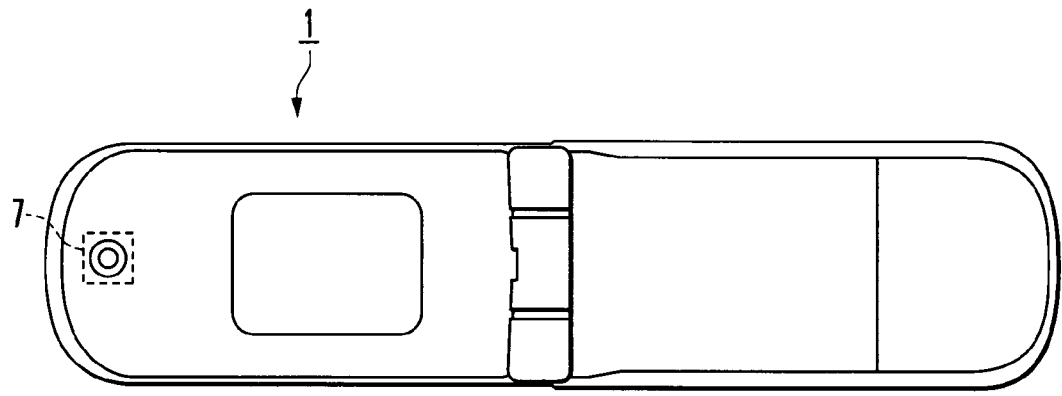
FIG. 1B is a view showing the outer appearance of the portable telephone according to the first embodiment of the present invention seen from a side opposite to that of FIG. 1A.

FIGS. 1A and 1B are views showing the outer appearances of the front and rear surfaces, respectively, of a folding portable telephone with a camera function as a portable terminal according to the first embodiment of the present invention. More specifically, FIG. 1A is a view showing the outer appearance of the display side in a state wherein the surface of a display unit housing and the surface of an input unit housing are open apart, and FIG. 1B is a view showing the outer appearance seen from a side opposite to that of FIG. 1A. As shown in FIGS. 1A and 1B, a folding portable telephone 1 includes a display unit housing 2, input unit housing 3, hinge 4, display unit 5, receiving speaker 6, camera unit 7, first sound emission portion 8, second sound emission portion 9, and the like. Although not illustrated, the folding portable telephone 1 is also provided with a battery, a speaker for producing an incoming-call melody or the like, a microphone for receiving voice, and the like.

The hinge 4 pivotally connects the display unit housing 2 and input unit housing 3. By pivoting the hinge 4, the display unit housing 2 is opened or covered with respect to the input unit housing 3. The input unit housing 3 includes buttons to input characters, numerals, and symbols, an operating unit such as a power ON/OFF button, a circuit board, a battery, and the like. The display unit housing 2 includes the display unit 5, receiving speaker 6, camera unit 7, and the like.

The display unit 5 serves to display an image, data such as a telephone number, various types of menus, information such as operation instructions, and the like, and comprises, e.g., an LCD (Liquid Crystal Display). The receiving speaker 6 is mounted in the position indicated by the broken line in FIG. 1A, and serves to produce received voice. An output sound from the receiving speaker 6 is emitted to the outside from the first sound emission portion 8 and second sound emission portion 9. The voice output method according to this embodiment employs a leak tolerant method which will be described later. The camera unit 7 is arranged at the position indicated by the broken line in FIG. 1B. The camera unit 7 includes a solid-state image sensor (CCD or the like) and a circuit which converts an image signal, input from an optical system when the camera unit 7 is operated, into a digital signal as image data.

Figure 2:
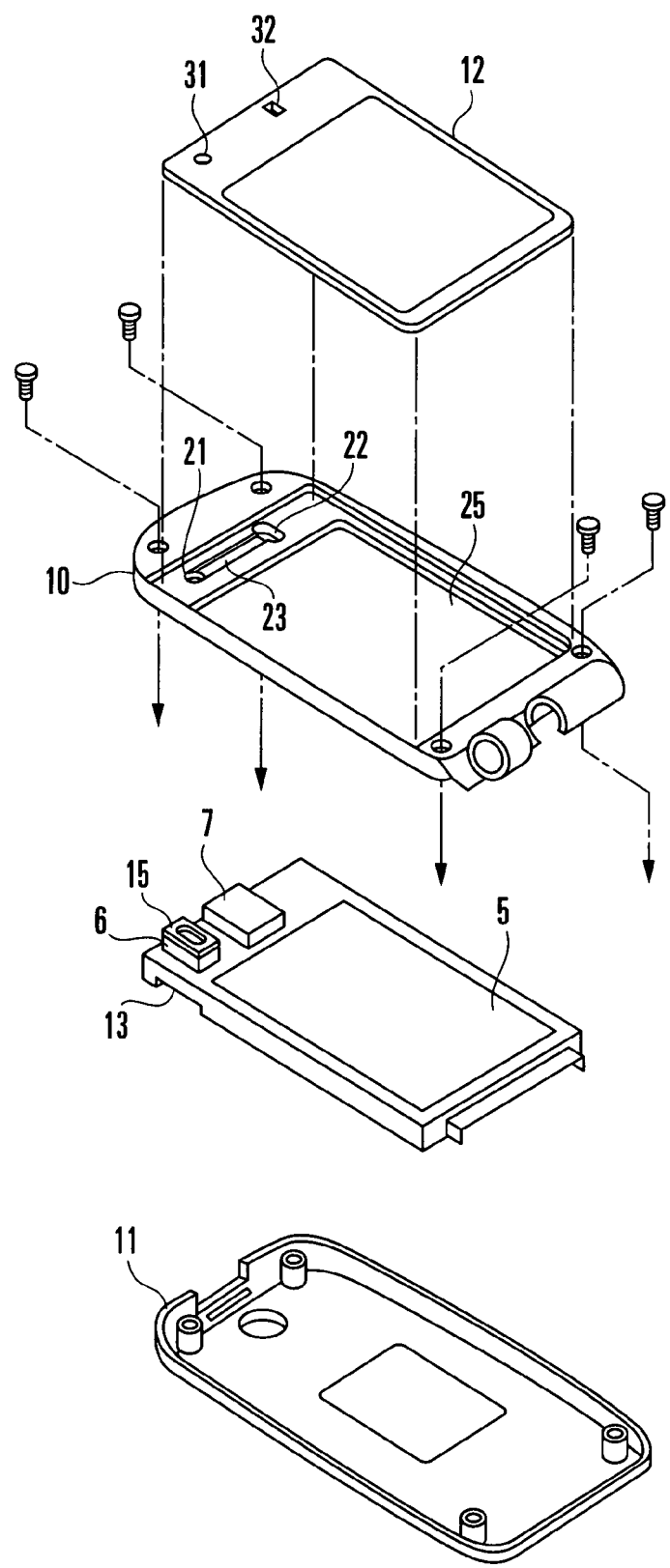
FIG. 2 is an exploded perspective view of the display unit housing of the portable telephone shown in FIGS. 1A and 1B.

FIG. 2 is an exploded perspective view of the display unit housing of the portable telephone shown in FIGS. 1A and 1B. As shown in FIG. 2, the display unit housing 2 comprises members such as a front housing 10, rear housing 11, screen 12, and display unit frame 13.

In addition to the display unit 5, the receiving speaker 6 and camera unit 7 are disposed on the display unit frame 13. The receiving speaker 6 and camera unit 7 are arranged in the vicinity of one side that opposes a side engaging with the hinge 4. The camera unit 7 is formed almost at the center in the vicinity of this one side. The receiving speaker 6 is disposed at a portion adjacent to the camera unit 7. The camera unit 7 includes an auto-focus function and the like and occupies a large area when compared to the receiving speaker 6.

The receiving speaker 6 and camera unit 7 are formed at a position opposing an earpiece portion 20, as shown in FIG. 1A. The earpiece portion 20 refers to a region where the user applies his ear when speaking over the telephone. The camera unit 7 is formed almost at the center of the earpiece portion 20. The display unit 5 covers a region extending from a portion adjacent to the camera unit 7 and receiving speaker 6 to the vicinity of one side that engages with the hinge 4.

The front housing 10 and rear housing 11 sandwich the display unit frame 13 and fit with each other to serve as the display unit housing 2. A fitting method can include, e.g., a method of fixing with screws, as shown in FIG. 2. The rear housing 11 comprises a camera lens and the like.

The front housing 10 includes a first through hole 21, third through hole 22, groove 23, screen adhering seat surface 24, opening 25, and the like. The first through hole 21 and third through hole 22 extend through the front housing 10. The first through hole 21 is formed at a position opposing the receiving speaker 6 on the display unit frame 13 when the front housing 10 and rear housing 11 sandwich the display unit frame 13. The third through hole 22 is formed at a position opposing the camera unit 7 on the display unit frame 13 when the front housing 10 and rear housing 11 sandwich the display unit frame 13. The groove 23 is formed in the front surface of the front housing 10 to communicate the first through hole 21 and third through hole 22. Accordingly, the groove 23 is disposed at a position opposing a portion ranging from the receiving speaker 6 to the camera unit 7 when the front housing 10 and rear housing 11 sandwich the display unit frame 13. The screen adhering seat surface 24 is a portion to be fixed to the screen 12 through a double-sided tape. The opening 25 is provided to allow the display unit 5 visually recognizable.

The screen 12 covers the surface of the front housing 10 to protect the display unit 5. In this embodiment, the screen 12 covers a sound guide hole 26 as well as the display unit 5. The screen 12 includes a second through hole 31 and fourth through hole 32 which extend through the screen 12. The second through hole 31 and fourth through hole 32 are disposed at such positions that they respectively coincide with the first through hole 21 and third through hole 22 formed in the front housing 10, when the screen 12 covers the front housing 10, to form through holes. As the material of the screen 12, at least a region which opposes the display unit 5 preferably employs a highly transparent member so that an image displayed on the display unit 5 is visually recognizable.

The first sound emission portion 8 is formed when the first through hole 21 in the front housing 10 integrates with the second through hole 31 in the screen 12. The second sound emission portion 9 is formed when the third through hole 22 in the front housing 10 integrates with the fourth through hole 34 in the screen 12. The first sound emission portion 8 and second sound emission portion 9 serve to emit the output sound from the receiving speaker 6 to the outside. The second sound emission portion 9 serves as a leak hole to constitute the leak tolerant method as the packaging method of the receiving speaker 6. The leak tolerant method refers to a method according to which, in order to reduce the acoustic influence caused by air leak between the receiving speaker and ear, an output sound generating main surface and a surface (rear surface) opposing it, which are usually separated are acoustically coupled to lower the acoustic output impedance of the receiving speaker. In this embodiment, the earpiece portion 20 includes a sound emission portion (first sound emission portion 8) which emits an output sound from the output sound generating main surface, and a leak portion (second sound emission portion 9) to leak the output sound from the surface opposing the output sound generating main surface.

The sound guide hole 26 is formed in the portion of the groove 23 of the front housing 10 when the screen 12 covers the front housing 10. The sound guide hole 26 serves to communicate the first sound emission portion 8 and second sound emission portion 9 so the output sound from the output sound generating main surface can be emitted from the second sound emission portion as well. Therefore, the second sound emission portion 9 is configured to serve as a leak hole as well as to emit the output sound from the output sound generating main surface.

Figure 3A:
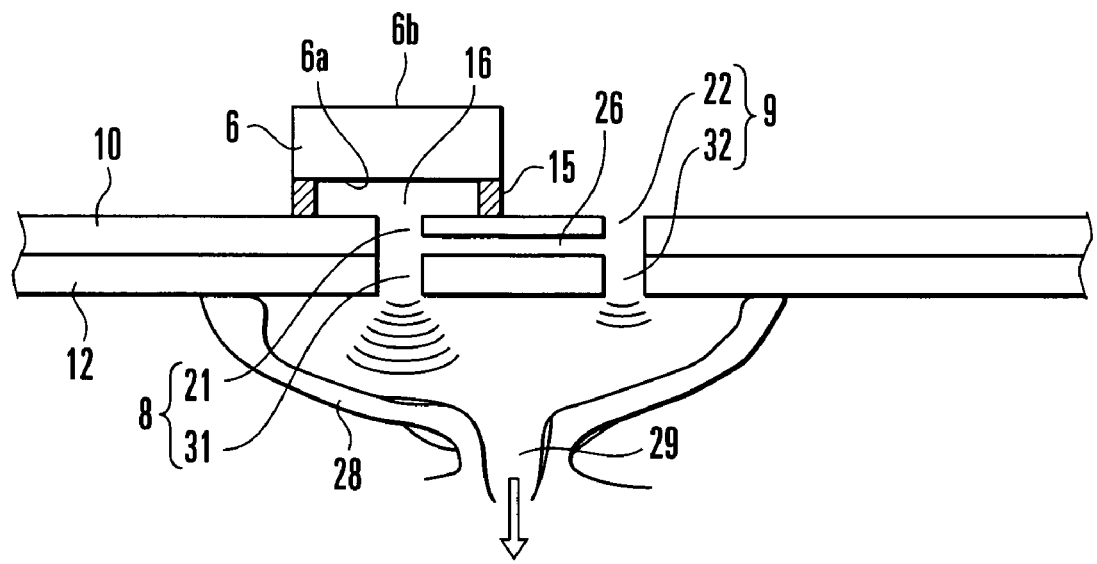
FIG. 3A is a sectional view showing a state wherein a first sound emission portion and second sound emission portion oppose internal space formed by the user's ear pinna.
Figure 3B:
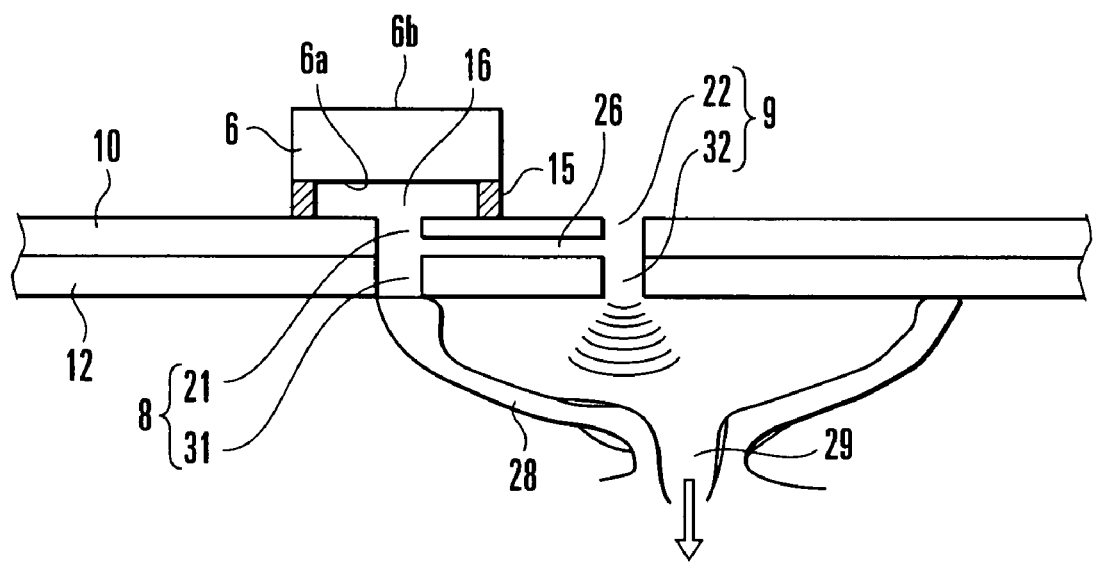
FIG. 3B is a sectional view showing a state wherein the ear helix or the like of the user's ear pinna covers the first sound emission portion and the second sound emission portion opposes the internal space formed by the user's ear pinna.

FIGS. 3A and 3B are schematic sectional views showing how the user applies his ear to the earpiece portion 20 of the folding portable telephone 1 to listen to the output sound from the receiving speaker 6. FIGS. 3A and 3B also schematically show how the output sound is output from the receiving speaker 6.

The receiving speaker 6 is mounted as it is abutted against the front housing 10 through a cushion 15 fixed to the peripheral portion of the receiving speaker 6. The cushion 15 serves not to leak the output sound from an output sound generating main surface 6a, and to prevent water or the like, which might enter from the sound emission portion or the like, from entering the apparatus. A space 16 is provided between the receiving speaker 6 and front housing 10.

FIG. 3A shows a state wherein the first sound emission portion 8 and second sound emission portion 9 formed in the earpiece portion 20 oppose the internal space formed by the user's ear pinna. Most of the output sound output from the output sound generating main surface 6a of the receiving speaker 6 is directed to the user's ear pinna through the first sound emission portion 8, passes through an external auditory canal 29, and reaches the eardrum and is sensed. Regarding the second sound emission portion, an output sound output from a rear surface (to be referred to as "output sound generating sub-surface 6b" hereinafter) on a side opposite to the output sound generating main surface 6a is emitted through the second sound emission portion 9. Very small part of the output sound output from the output sound generating main surface 6a of the receiving speaker 6 is emitted from the second sound emission portion 9 through the sound guide hole 26.

FIG. 3B shows a state wherein the ear helix or the like of the user's ear pinna covers the first sound emission portion 8 and the second sound emission portion 9 opposes the internal space formed by the user's ear pinna. In this case, as the user's ear pinna covers the first sound emission portion 8, the first sound emission portion 8 hardly emits any output sound. Instead, the output sound output from the output sound generating main surface 6a of the receiving speaker 6 is directed from the second sound emission portion 9 to the user's ear pinna through the sound guide hole 26, passes through the external auditory canal 29, and reaches the eardrum and is sensed. Thus, the user can obtain a sufficient output sound even if he covers the first sound emission portion 8 with the ear helix or the like of his ear pinna.

According to this embodiment, the first sound emission portion 8 is formed in a surface that opposes the receiving speaker 6, and the second sound emission portion is formed in a surface that opposes the camera unit. Even if the ear helix or the like of the ear pinna covers one of the sound emission portions, the user can sense the output sound from the receiving speaker 6 via the other sound emission portion. In this embodiment, the second sound emission portion is formed at the center of the earpiece portion 20, and the first sound emission portion 8 is formed at a position shifted from the center. Hence, the ear helix or the like of the user's ear pinna may cover the first sound emission portion 8 at a high possibility. Even in such a case, the above arrangement allows the user to listen to the output sound well. Because of the structure (leak tolerant structure) that allows the user to receive with the earpiece portion the output sound output from the output sound generating sub-surface 6b, a high-quality output sound can be provided.

The sound guide hole 26 is formed by forming the groove 23 in the front housing 10 and covering the groove 23 with the screen 12. Hence, no earpiece portion need project as in the portable telephone described in reference 1. This enables the folding portable telephone 1 to be made thin, and no design limitations are imposed on the surface of the portable telephone. As the second sound emission portion 9 is formed at the position adjacent to the portion opposing the receiving speaker 6, the receiving speaker 6 itself need not be made large, eliminating the need for sacrificing downsizing. As the user can listen to the output sound from the output sound generating main surface 6a via the second sound emission portion 9 which does not oppose the receiving speaker 6, the degrees of freedom of the position to form the receiving speaker 6 can be increased. Therefore, the first embodiment can be employed particularly suitably in a digital portable telephone with a camera or a W-CDMA information communication terminal, in which the receiving speaker 6 must be arranged at a position shifted from the center.

Second Embodiment

The second embodiment of the present invention will be described hereinafter. In the following description, the same elements and members as those of the first embodiment are denoted by the same reference numerals and will not be illustrated when appropriate.

Figure 4A:
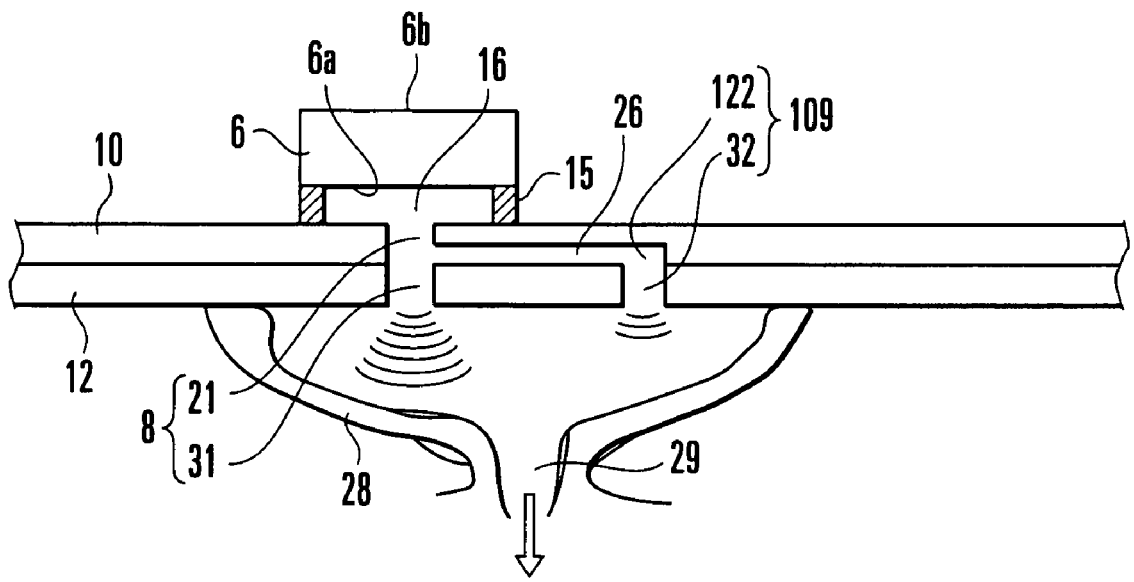
FIG. 4A is a sectional view showing a state in the second embodiment of the present invention wherein a first sound emission portion and second sound emission portion oppose internal space formed by the user's ear pinna.
Figure 4B:
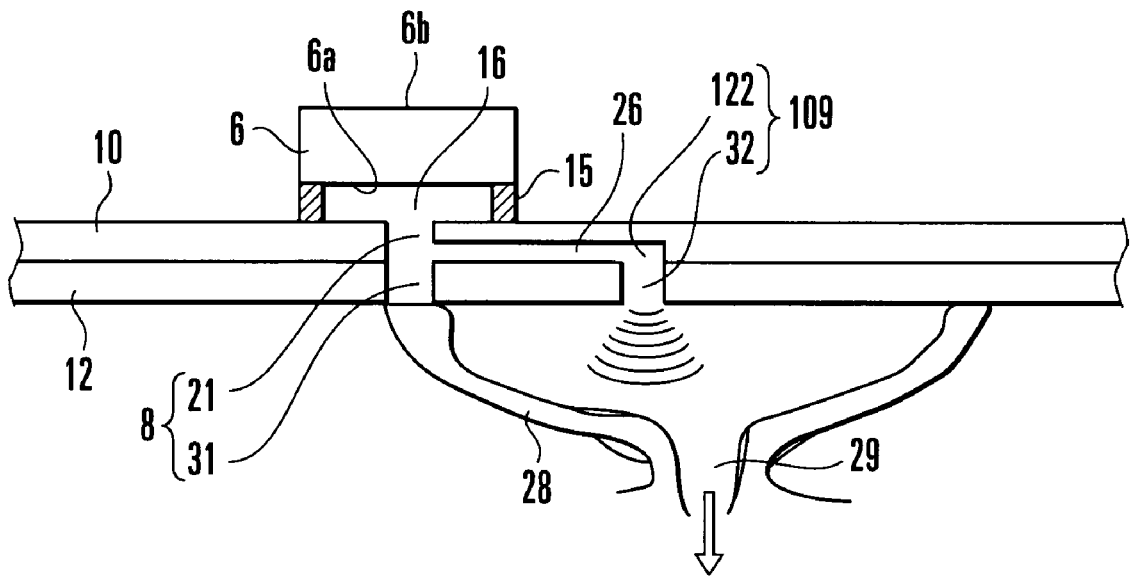
FIG. 4B is a sectional view showing a state in the second embodiment of the present invention wherein the ear helix or the like of the user's ear pinna covers the first sound emission portion and the second sound emission portion opposes the internal space formed by the user's ear pinna.

FIGS. 4A and 4B are schematic views to explain how the user listens to an output sound from a receiving speaker 6 in a portable telephone according to this embodiment. The basic arrangement and operation of portable telephone according to this embodiment are the same as those of the first embodiment except for the following respects. More specifically, the second embodiment is different from the first embodiment in that although the first embodiment employs the leak tolerant structure, the second embodiment does not employ one, and that the user can listen to only an output sound from an output sound generating main surface 6a with an earpiece portion 20. In other words, the second embodiment is different from the first embodiment in that although the second sound emission portion 9 of the first embodiment comprises a through hole, a second sound emission portion 109 of the second embodiment comprises a groove structure. More specifically, although the second sound emission portion 9 of the first embodiment comprises the third through hole 22 and fourth through hole 32, the second sound emission portion 109 of the second embodiment comprises a groove 122 connected to a groove 23 that forms a sound guide hole 26, and a fourth through hole 32.

FIG. 4A shows a state wherein a first sound emission portion 8 and the second sound emission portion 109 oppose internal space formed by the user's ear pinna. The output sound output from the output sound generating main surface 6a of the receiving speaker 6 is directed to the user's ear pinna through the first sound emission portion 8, passes through an external auditory canal 29, and reaches the eardrum and is sensed. The output sound output from the output sound generating main surface 6a of the receiving speaker 6 is directed to the user's ear pinna through the sound guide hole 26 communicating with the first sound emission portion 8, and the second sound emission portion 109, passes through the external auditory canal 29, and reaches the eardrum and is sensed.

FIG. 4B shows a state wherein the ear helix or the like of the user's ear pinna covers the first sound emission portion 8 and the second sound emission portion 109 opposes the internal space formed by the user's ear pinna. In this case, as the user's ear pinna covers the first sound emission portion 8, the output sound output from the output sound generating main surface 6a of the receiving speaker 6 is directed to the user's ear pinna through mainly the sound guide hole 26 and second sound emission portion 109, passes through the external auditory canal 29, and reaches the eardrum and is sensed.

According to this embodiment, the first sound emission portion 8 is formed in a surface that opposes the receiving speaker 6, and the second sound emission portion 109 is formed in a surface that opposes a camera unit 7. Even if the ear helix or the like of the ear pinna covers one of the sound emission portions, the user can sense the output sound from the receiving speaker 6 via the other sound emission portion. In this embodiment, the second sound emission portion 109 is formed at the center of the earpiece portion 20, and the first sound emission portion 8 is formed at a position shifted from the center. Hence, the ear helix or the like of the user's ear pinna may cover the first sound emission portion 8 at a high possibility. Even in such a case, the above arrangement allows the user to listen to the output sound well.

Figure 5:
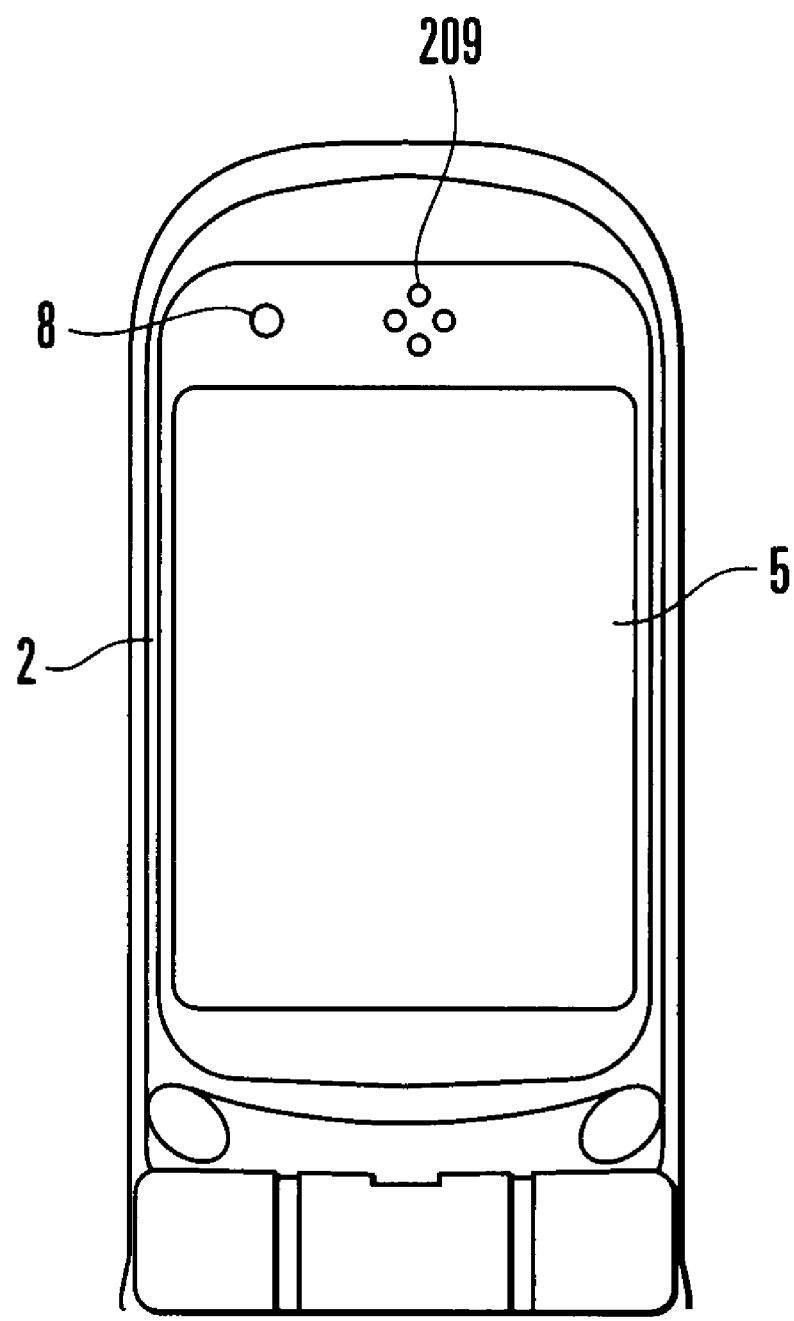
FIG. 5 is a view showing the outer appearance of a portable telephone including a plurality of second sound emission portions.

The first and second embodiments exemplified a case wherein one first sound emission portion 8 and one second sound emission portion 9 (109) are disposed. However, the present invention is not limited to this, but the first sound emission portion 8 may comprises a plurality of first sound emission portions, and the second sound emission portion 9 (109) may comprise a plurality of second sound emission portions. For example, as shown in FIG. 5, three through holes may be provided to form a second sound emission portion 209.

Practical Example

The embodiments described above will be described in more detail. Note that the following practical example does not limit the scope of the present invention at all.

A portable telephone according to the practical example employed the receiving system of the receiving speaker 6 of the portable telephone 1 according to the first embodiment was employed (see FIGS. 3A and 3B). More specifically, the leak tolerant structure was employed. An earpiece portion 20 was provided with a first sound emission portion 8 which opposed a receiving speaker 6, and a second sound emission portion 9 which leaked an output sound produced from an output sound generating sub-surface 6b of the receiving speaker 6. A sound guide hole 26 communicated the first sound emission portion 8 and second sound emission portion 9. The sound guide hole 26 had a depth of 0.25 mm, a width of 1.2 mm, and a length of 7 mm. A portable telephone as a comparative example had the same arrangement as that of the above practical example except that it had no sound guide hole 26.

The characteristics of the sound pressure, output from the receiving speaker 6 to the outside, as a function of the frequency were measured for each of the practical example and the comparative example. The measurement took place under conditions that reproduced a state wherein the first sound emission portion 8 and second sound emission portion 9 provided to the earpiece portion 20 opposed the internal space formed by the user's ear pinna, as shown in FIG. 3A, and a state wherein the ear helix or the like of the user's ear pinna covered the first sound emission portion 8 and the second sound emission portion 9 opposed the internal space formed by the user's ear pinna, as shown in FIG. 3B.

Figure 6:
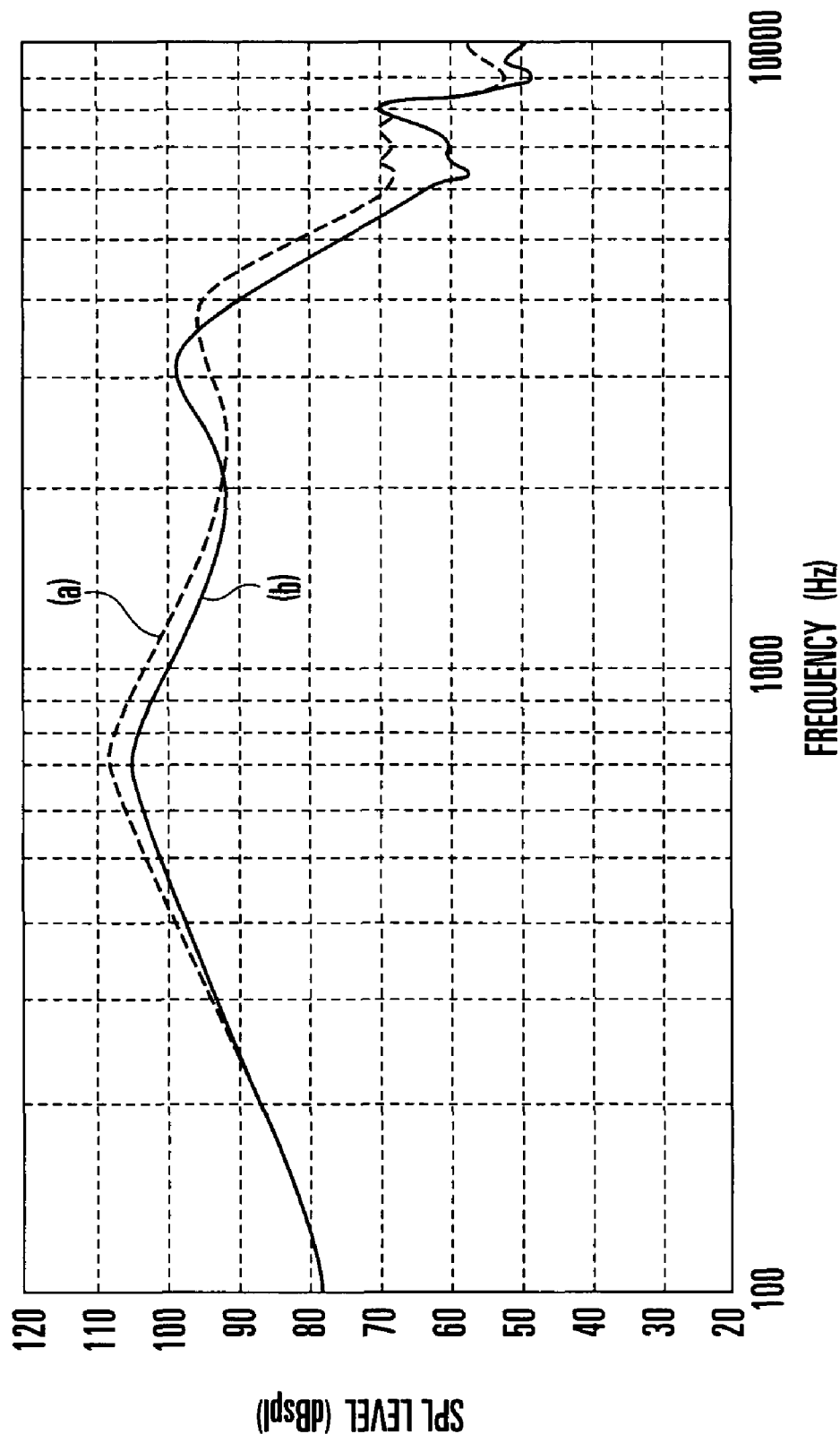
FIG. 6 is a graph obtained by plotting the sound pressure as a function of the frequency in a portable telephone according to a practical example of the present invention.

FIG. 6 shows the results obtained by measuring the characteristics of the sound pressure as a function of the frequency of the receiving speaker 6, of a portable telephone 1 according to this practical example. In FIG. 6, the sound pressure was plotted as a function of the frequency. In FIG. 6, (a) shows the result of measurement when none of the first sound emission portion 8 and second sound emission portion 9 was covered, and (b) shows the result of measurement when only the first sound emission portion 8 was covered. When the first sound emission portion 8 was not covered, at 1 kHz, the sound pressure was about 103 dBspl, as indicated by (a). When the first sound emission portion 8 was covered, at 1 kHz, the sound pressure was about 100 dBspl, as indicated by (b). These results confirmed that even when the first sound emission portion 8 was covered, the sound pressure dropped by approximately 3 dB from that of the case wherein none of the first sound emission portion 8 and second sound emission portion 9 was covered, which imposed no particular problem in practice.

Figure 7:
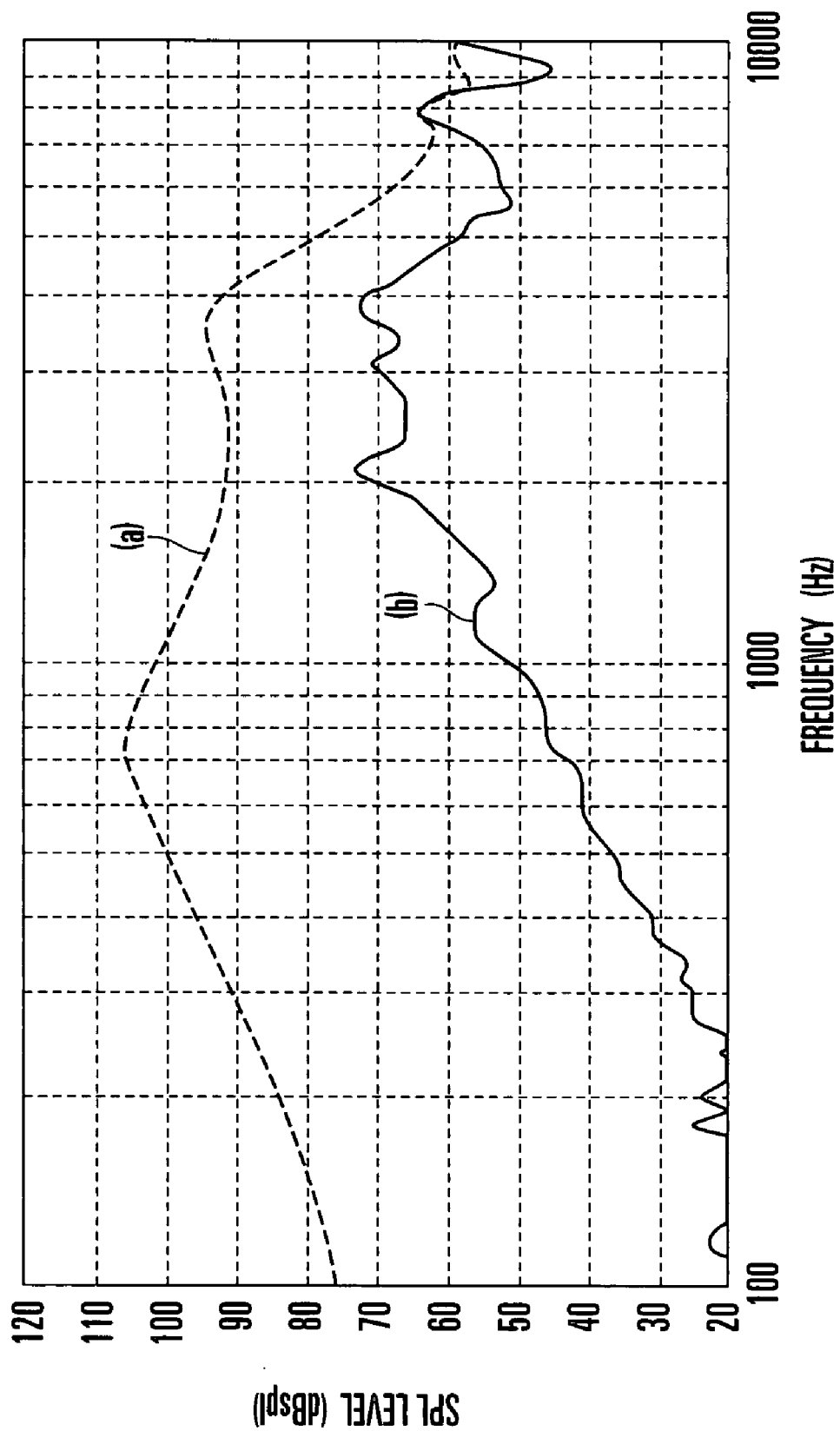
FIG. 7 is a graph obtained by plotting the sound pressure as a function of the frequency in a portable telephone as a comparative example.

FIG. 7 shows results obtained by measuring the characteristics of the sound pressure as a function of the frequency, of a receiving speaker 6 of a portable telephone as a comparative example. In FIG. 7, a curve (a) shows the result of measurement when none of a first sound emission portion 8 and a second sound emission portion 9 was covered, and (b) shows the result of measurement when only the first sound emission portion 8 was covered. When the first sound emission portion 8 was not covered, at 1 kHz, the sound pressure was about 100 dBspl, as indicated by (a). When the first sound emission portion 8 was covered, at 1 kHz, the sound pressure was about 50 dBspl, as indicated by (b). This suggests that when the first sound emission portion 8 is covered, the sound pressure drops by 50 dB from that of the case wherein none of the first sound emission portion 8 and second sound emission portion 9 is covered. Furthermore, when the frequency was 500 Hz, the sound pressure dropped by about 64 dB. At the frequency of 500 Hz, when the first sound emission portion 8 was covered, the actual sound pressure was about 36 dBspl. Only an output sound that the user considered silent was produced.

According to this practical example, even when the first sound emission portion 8 was covered, the sound pressure drop amount could be decreased to 1/10 or less that of the comparative example. An output sound that caused no problem on the practical level could be emitted.

The invention claimed is:

1. A portable terminal characterized by comprising:
a housing which incorporates a display unit and a receiving speaker;
an earpiece portion which allows a user to listen to an output sound from said receiving speaker;
a first sound emission portion and a second sound emission portion which guide the output sound from said receiving speaker to said earpiece portion;
a sound guide hole which communicates said first sound emission portion and said second sound emission portion; and
a screen which protects said display unit,
wherein said first sound emission portion is formed at a position opposing an output sound generating main surface of said receiving speaker disposed at an off-center position of said earpiece portion,
said second sound emission portion is formed at a portion adjacent to the position opposing said output sound generating main surface of said receiving speaker, said second sound emission portion being located at a center of said earpiece portion, said second sound emission portion is formed to emit the output sound generated by said output sound generating main surface of said receiving speaker to the outside and to emit an output sound generated from a rear surface on the back of said output sound generating main surface of said receiving speaker to the outside, and
said sound guide hole is formed by covering a groove with said screen, said groove being formed in said housing to connect said first sound emission portion and said second sound emission portion.

2. A portable terminal according to claim 1, characterized in that said first sound emission portion comprises
a first through hole extending through said housing, and
a second through hole extending through said screen.

3. A portable terminal according to claim 2, characterized in that said second sound emission portion comprises
a third through hole extending through said housing, and
a fourth through hole extending through said screen.

4. A portable terminal according to claim 2, characterized in that said second sound emission portion comprises
a groove structure which is formed on said housing and connected to said groove, and
a fourth through hole extending through said screen.

5. A portable terminal according to claim 1, characterized in that at least one of said first sound emission portion and said second sound emission portion comprises a plurality of sound emission portions.

6. A portable terminal according to claim 1, characterized by further comprising a camera unit incorporated in said housing,
wherein said earpiece portion opposes said receiving speaker and said camera unit which are incorporated in said housing, said camera unit is arranged at substantially a center of said earpiece portion, and said second sound emission portion opposes said camera unit.

* * * * *